July 28, 1964 B. LELAND 3,142,581
METHOD OF TREATING POLYESTER POLYMER MATERIALS
TO IMPROVE THEIR ADHESION CHARACTERISTICS
Filed Sept. 18, 1961
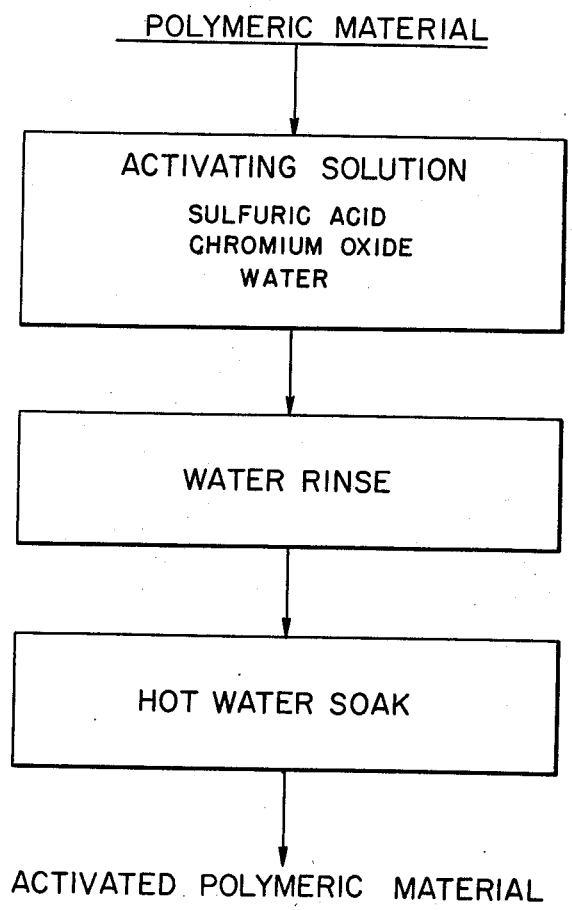
INVENTOR
BERNARD LELAND
BY *Bertham M. Mullin*
ATTORNEY

United States Patent Office 3,142,581
Patented July 28, 1964

3,142,581
METHOD OF TREATING POLYESTER POLYMER MATERIALS TO IMPROVE THEIR ADHESION CHARACTERISTICS
Bernard Leland, Poughkeepsie, N.Y., assignor to International Business Machines Corporation, New York, N.Y., a corporation of New York
Filed Sept. 18, 1961, Ser. No. 138,609
3 Claims. (Cl. 117—47)

This invention relates to the surface treatment of polyester polymer products and to the products resulting from such treatment. More particularly, this invention concerns the activation of adhesion properties on a surface of a polyester polymer product to provide the product with a receptivity toward metal and other coating compositions.

In the data processing and computer fields, extensive use is being made of record carriers, such as tapes, discs and cards, which are formed by depositing magnetic recording layers upon polyester polymer bases. One type of polyester that is especially preferred as a base material is poly (ethylene terephthalate) which is sold under the trademark "Mylar." In many applications, a non-metallic recording layer is placed upon such a base, and in an increasingly large number of cases it is desired that the recording layer be a magnetic metal such as nickel or a nickel-cobalt alloy. Difficulties have been encountered heretofore in attempting to deposit a layer of metal or metal ions upon a polyester polymer base in that this kind of material, like many other plastics, is not normally receptive to the aqueous solutions employed in metal plating processes and prior efforts to overcome this deficiency have not been particularly successful. Moreover, the adhesion properties at the surface of such a material normally are low. Hence, the kind of plating which has been effected upon polyester polymer bases in the past has been characterized by undesirable void spots or by spots of low adhesion from which the metal is apt to be stripped or flaked during normal usage of the product. This makes it highly desirable that some way be found to activate the polyester polymer so as to increase its adhesion properties at its surface and render the surface hydrophilic while, at the same time, retaining the normal strength and other desirable physical properties of the material.

In the present state of the art, various methods are available for activating the surface of a polymer or plastic material. However, the prior art methods are not satisfactory for activating adhesion properties on the surface of a polyester polymer material. For example, polyethylene (which is not a polyester polymer and has a chemical structure different from poly (ethylene terephthalate)) is activated by oxidizing the surface of the product with a strong sulfuric acid/dichromate solution. The oxidizing treatment produces a hydrophilic surface on the polyethylene which is adaptable to cementing, printing and metallizing. The solution for treating polyethylene is made by saturating concentrated sulfuric acid with sodium dichromate; the polyethylene is passed through this oxidizing bath, washed in water and dried. Although this particular solution works well with polyethylene, if it were applied to poly (ethylene terephthalate) which reacts differently, it would render the material unusable by severely weakening it or destroying it altogether.

Accordingly, it is an object of this invention to impart altered surface properties to a polyester polymer product so as to make the product receptive to metal and metal ions.

Other objects include:
Providing a method for activating adhesion properties on the surface of a polyester polymer product without unduly reducing the desirable physical properties of the material;
Providing a polyester polymer product with a hydrophilic, highly polar surface compound;
Providing an economical and efficient process for activating a polyester polymer material in the manner indicated above.

In accordance with the invention, the surface of a polyester polymer product, such as poly (ethylene terephthalate), is activated by exposing the surface to a solution containing 0.32 to 0.57 mol percent sodium dichromate (anhydrous), 33.4 to 53.8 mol percent sulfuric acid (anhydrous) and the balance water. The duration of the treatment depends upon the concentration and temperature of the activating solution. The treatment causes surface hydrolysis of the polyester polymer, thereby improving its wetting characteristics and produces a surface with highly reactive polar sites, at which bonding of the polymer to metal or metal ions can readily occur. The normal surface properties of the polyester polymer product are thereby altered to provide a hydrophilic, polar surface which is receptive to the aqueous solutions used in metal plating processes and which is readily bondable to metal plating. This is accomplished without unduly weakening or otherwise adversely affecting the physical characteristics of the polyester polymer product.

The foregoing and other objects, features and advantages of the invention will be apparent from the following more particular description of preferred embodiments of the invention.

The drawing is a flow chart of the process of this invention.

More particulraly, in accordance with the invention, the surface of a polyester polymer product, such as poly (ethylene terephthalate) is altered so that a coating placed thereon in accordance with standard procedures has a high adhesion strength which may be on the order of 1000 grams per inch, as measured by a 180°-peel-back-adhesion test. The high adhesion is obtained by hydrolyzing the surface of the polyester polymer product by immersing it for a period of at least 5 seconds in an activating solution comprising 0.32 to 0.57 mol percent sodium dichromate (anhydrous), 33.4 to 53.8 mol percent surfuric acid (anhydrous) and the balance water, the solution being maintained at a temperature between 40° C. to 80° C. The amount of hydroxyl formation may be increased by immersing the product in water maintained at a temperature between 48° C. to 80° C. for a period of at least 30 seconds.

When the above treatment is applied, for example, to poly (ethylene terephthalate) represented by the structural formula:

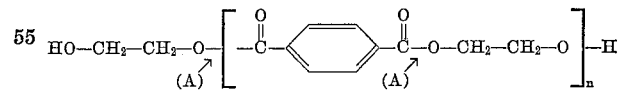

where $n$ is an integer from 100 to 150, the surface is hydrolyzed by breaking of bands at sites (A) resulting in carboxyl and hydroxyl groups. The reaction is essentially the reverse of the esterification reaction by which the polymer is originally formed and produces a highly polar surface. The formation of these groups on the surface increases the ability of the surface to be wetted by water and provides reactive sites on the surface of the material. In performing the surface treatment, it is important to control the degree of reaction. If the surface is insufficiently reacted, wetting may take place but adhesion of the metal layer will be poor. On the other hand, over reacting the surface causes roughening and an undue weakening in the physical properties of the polymer product. For these reasons, the parameters of time, temperature and concentration must be carefully controlled.

Typical examples of preferred embodiments of this invention, selected for purposes of illustration, are given below.

*Example 1*

A poly(ethylene terephthalate) sheet is immersed in a solution containing 0.44 mol percent sodium dichromate, 47.6 mol percent sulfuric acid and the remainder water for a period of 5 to 30 seconds. The solution is made by dissolving 40.6 grams of $Na_2Cr_2O_7 2H_2O$ in a solution containing 770 milliliters of sulfuric acid (66° Bé.) and 210 milliliters of water. The solution is maintained at a temperature in the range between 75° C. to 80° C. The sheet is rinsed, and immersed in hot water maintained at a temperature between 80° C. to 100° C. for a period of 90 to 120 seconds. The amount of hydrolysis and the reliability of obtaining a uniform layer on the surface of the polymer is increased by the hot water soak. The surface now has a receptivity for aqueous sensitizing solutions, such as stannous chloride and palladium chloride solutions. A nickel layer plated on the surface by conventional electroless techniques has an adhesion strength in the order of 1000 grams per inch.

*Example 2*

The treatment is the same as for Example 1, except that the solution contains 0.57 mol percent sodium dichromate, 53.8 mol percent sulfuric acid and the remainder water. This solution provides a surface which is slightly etched but a nickel layer plated on the surface by conventional techniques has the required adhesion strength. With solutions containing greater amounts of sodium dichromate and sulfuric acid, adhesion strengths lower than those required result. As the sulfuric acid approaches saturation with the sodium dichromate, the adhesion strength essentially becomes zero and the polyester polymer material is severely damaged if not destroyed.

*Example 3*

The treatment is the same as for Example 1, except that the solution contains 0.32 mol percent sodium dichromate, 33.4 mol percent sulfuric acid and the remainder water. This solution provides the surface with the required adhesion strength; however, a metal layer placed on the surface by conventional techniques may have pits and voids. The number of pits and voids increases as the concentration of the sodium dichromate and sulfuric acid is decreased.

In accordance with the invention, polyester polymer surfaces are provided which are readily plated with thin films of copper, tin, nickel, silver or the like by conventional techniques. The invention is not necessarily limited to the metal plating applications herein described, however, since it can be utilized also to improve the adhesion between polyester polymer surfaces and certain organic compounds such as the binders employed in magnetic oxide coatings.

While the invention has been particularly described and shown with reference to preferred embodiments thereof, it will be understood by those skilled in the art that various changes in form and details may be made therein without departing from the spirit and scope of the invention.

I claim:

1. A process for imparting receptivity for metal and metal ions to at least one surface of a poly (ethylene terephthalate) polymer product by the steps of:

contacting said product with an activating solution maintained at a temperature in the range from 40° C. to 80° C. for a period of at least 5 seconds where said activating solution is formed by reacting from about 0.32 to 0.57 mol percent sodium dichromate, from about 33.4 to 53.8 mol percent sulfuric acid and the balance water;

rinsing said surface with water; and, contacting said surface in water maintained at a temperature in the range between 48° C. to 100° C. for a period between 30 to 120 seconds.

2. A process for imparting receptivity for metal and metal ions to at least one surface of a poly (ethylene terephthalate) product by the steps of:

contacting said product with an activating solution maintained at a temperature in the range from 40° C. to 80° C. for a period between 5 to 30 seconds where said activating solution is formed by reacting from about 0.32 to 0.57 mol percent sodium dichromate, from about 33.4 to 53.8 mol percent sulfuric acid and the balance water;

rinsing said surface with water; and, soaking said surface in water maintained at a temperature in the range between 48° C. to 100° C. for a period between 30 to 120 seconds.

3. The reaction product formed by:

contacting a poly (ethylene terephthalate) product with an acivating solution maintained at a temperature in the range between 40° C. to 80° C. for a period of at least 5 seconds where said activating solution is formed by reacting from about 0.32 to 0.57 mol percent sodium dichromate, from about 33.4 to 53.8 mol percent sulfuric acid and the balance water;

rinsing said surface with water; and, contacting said reaction product with water maintained at a temperature in the range between 48° C. to 100° C. for a period between 30 to 120 seconds.

References Cited in the file of this patent

UNITED STATES PATENTS

| | | |
|---|---|---|
| 3,035,915 | Cohen | May 22, 1962 |
| 3,035,916 | Heiart | May 22, 1962 |
| 3,035,941 | Cohen | May 22, 1962 |